April 25, 1967  V. FLINK  3,315,791
CONNECTING LINK STRUCTURE FOR CONVEYOR
Filed Oct. 20, 1965
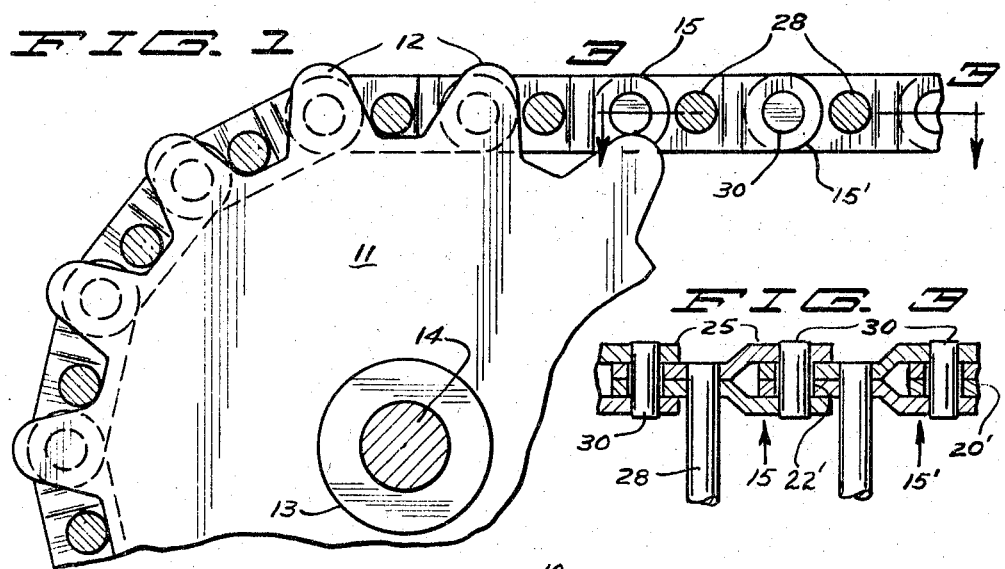
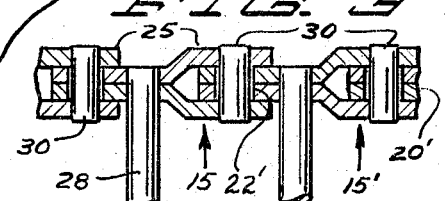
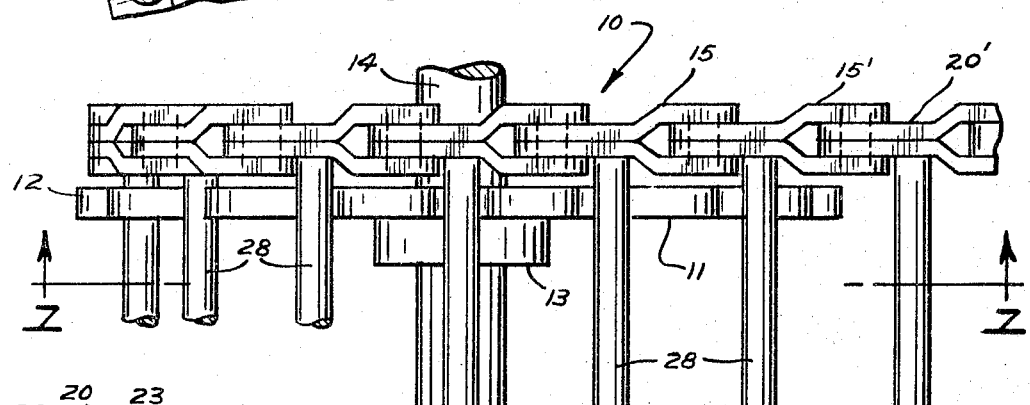
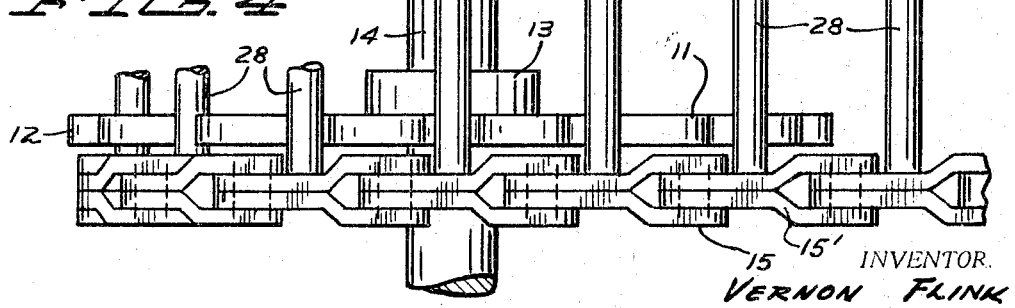
INVENTOR.
VERNON FLINK
BY
Richard Gregory
ATTORNEYS

United States Patent Office 3,315,791
Patented Apr. 25, 1967

3,315,791
CONNECTING LINK STRUCTURE
FOR CONVEYOR
Vernon Flink, Cambridge, Minn., assignor to Braco, Inc., Braham, Minn., a corporation of Minnesota
Filed Oct. 20, 1965, Ser. No. 498,769
1 Claim. (Cl. 198—195)

This invention relates to improvement in the construction of a conveyor belt, such as the type of conveyor belt used in connection with apparatus for harvesting root crops, such as a potato crop.

The common construction of a conventional conveyor belt of the type indicated comprises transverse rod-like links having right-angled reversely bent end portions forming hooks for interengagement with one another. This results in providing poor bearing surfaces between engaging portions of said links with a resulting uneven wear which develops into uneven and irregular spacing between links as well as frequent breaking. The irregular spacing results in poor registry with the teeth of supporting sprocket wheels.

It is desirable to have and an object of this invention to provide improvement in the connecting structure of the links or link sections which make up a conveyor belt.

It is another object of this invention to provide a connecting structure for a conveyor belt comprising a bearing structure resulting in uniform and wear resisting engagement between portions having relative movement.

It is also an object of this invention to provide a conveyor belt structure having spaced transverse rods integral and rigid with the connecting linkage of said belt.

These and other objects and advantages of the invention will be set forth in the following description made in connection with the accompanying drawings in which like reference characters refer to similar parts throughout the several views and in which:

FIG. 1 is a broken view in vertical section taken on line 1—1 of FIG. 2 as indicated;

FIG. 2 is a broken view in plan showing a portion of the conveyor belt herein having parts broken away therefrom;

FIG. 3 is a broken view in vertical section taken on line 3—3 of FIG. 1 as indicated, showing a detail of construction; and FIG. 4 is a broken view in horizontal section showing a connecting member on a somewhat enlarged scale.

Referring to the drawings, a representative portion is shown of an endless conveyor belt 10 of the construction herein disclosed. Said belt is supported by a conventional sprocket wheel 11 having a hub portion 13 which is carried on a shaft 14 which in turn will be embodied in a supporting structure, such as a harvesting machine.

Said conveyor belt is made up of connected link sections to be hereinafter described, with representative of such sections being indicated by the characters 15—15 and 15'—15'. The link section 15—15 and a link 15 will be described in some detail.

Said link 15 comprises an elongated unitary bar-like shank 20 having a first transverse aperture 22 therethrough adjacent the free end portion thereof. Said aperture will be particularly formed to have a suitable long wearing bearing surface for the purpose herein indicated. Said shank has a bifurcated extension of one end portion thereof forming a yoke or forked portion 25 comprising spaced arms, with said spaced arms having a pair of transversely aligned apertures 26. Said arms will be spaced apart just the distance to accommodate the width of said shank therebetween and will have just sufficient length to receive an end portion of said shank therein, as will be described.

At the inner end portion of said shank adjacent said forked portion 25 is a transverse aperture 23.

A pair of the links 15 in transverse spaced alignment will have a connecting or link rod 28 therebetween. Said rod will have its respective ends press fit or welded into the apertures 23 of said pair of links to be rigid with said links. Thus a pair of said links 15 and a connecting or link rod 28 therebetween form said link section 15—15.

Said conveyor belt 10 is made up of identical of said link sections 15—15 connected together. For ease of description a second link section has been indicated by the characters 15'—15' made up of links 15' and a connecting rod 28'. The portions of link 15' corresponding to those of the link 15 bear the same characters with a prime added.

To connect link sections, the adjacent of said links 15 and 15' are interengaged and connected by having the shanks 20' of the links 15' disposed between the respective adjacent spaced arms 25 of the links 15 to position their respective apertures 22' and 26 to be in register. Said arm portions will be of just sufficient length for this purpose. A pin 30 is disposed through the apertures in register of the interengaged portions of said links.

The pins 30 will be press fit for rigid engagement within the apertures 26 of the spaced arms. The central portions of said pins 30 however will form journals being disposed within the apertures 22', which apertures form bearings. Thus the links provide a specific bearing structure for connection with said pins 30. The spaced arms 25 attached to the shank 20' will have free rotative movement about the pins 30 journaled within the bearings formed by said apertures 22'. The conveyor belt is formed with successive of said link sections being connected in like manner.

It will be noted that the links 15 are not arranged to pass over sprocket teeth. The purpose of said links is solely for the purpose of providing a highly efficient and long wearing connecting means between adjacent of link sections. The connecting or link rods are supported directly on the sprocket wheels as shown, with said rods being spaced to mesh with the teeth of the sprocket wheels.

In the event replacement of a link section is required, the necessary pins 30 are removed by being tapped out and a new link section is readily substituted for the one removed. The conveyor belt does not require the substantial loosening or the substantial slack for replacement of link sections that is required in a conventional belt structure having interengaged hook portions of links.

Thus it is seen that I have provided a conveyor belt construction embodying the use of simple and efficient bearing-equipped connecting means.

It will of course be understood that various changes may be made in the form, details, arrangement and proportions of the parts, without departing from the scope of applicant's invention which, generally stated, consists in a device capable of carrying out the objects above set forth, in the parts and combinations of parts disclosed and defined in the appended claim.

What is claimed is:

An endless conveyor belt construction having in combination, a series of links, each of said links comprising
a shank, a bifurcated extension of said shank forming spaced arms,
said shank having a first transverse aperture adjacent the free end portion thereof, and a second transverse aperture adjacent said bifurcated portion, said first aperture being arranged and constructed to form a bearing,
said spaced arms having transverse spaced apertures,
a pair of said links in spaced transverse alignment, a rod connecting said pair of links having its ends respectively rigidly secured in said second of said apertures, said pair of links and said rod therewith forming a link section, a second of said link sections, the shank portions of said links of said first link section being respectively disposed within the spaced arm portions of said second link section with said first apertures in said shanks being respectively in register with said spaced apertures in said arm portions, a pin respectively disposed through said apertures in each of said spaced arm portions and through said apertures forming bearings in said shank in register therewith, and said pins at their end portions being respecitvely rigidly secured within said apertures of said spaced arm portions and having central portions forming journals having free rotation within said bearings.

References Cited by the Examiner

UNITED STATES PATENTS

| | | | |
|---|---|---|---|
| 562,069 | 6/1896 | Coxe | 198—195 X |
| 629,052 | 7/1899 | Taylor | 198—195 X |
| 1,624,111 | 4/1927 | Mullally. | |
| 2,969,870 | 1/1961 | Pulver | 198—195 |

FOREIGN PATENTS 567,103   12/1932   Germany.

EVON C. BLUNK, *Primary Examiner.*

R. J. HICKEY, *Assistant Examiner.*